US009593641B2

(12) United States Patent
Gabriel et al.

(10) Patent No.: US 9,593,641 B2
(45) Date of Patent: Mar. 14, 2017

(54) LASER WELDED PISTON ASSEMBLY

(71) Applicant: MAHLE International GmbH, Stuttgart (DE)

(72) Inventors: Dieter Gabriel, Highland, MI (US); Wolfgang Rein, Milford, MI (US); Steve Walker, Talbott, TN (US); Volker Weisse, Stuttgart (DE); Michael Ulrich, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 725 days.

(21) Appl. No.: 13/623,632

(22) Filed: Sep. 20, 2012

(65) Prior Publication Data

US 2013/0068096 A1    Mar. 21, 2013

Related U.S. Application Data

(60) Provisional application No. 61/537,370, filed on Sep. 21, 2011.

(51) Int. Cl.
*F02F 3/00* (2006.01)
*F02F 3/22* (2006.01)
(Continued)

(52) U.S. Cl.
CPC .............. *F02F 3/22* (2013.01); *B23K 26/282* (2015.10); *B23K 26/32* (2013.01); *B23P 15/10* (2013.01);
(Continued)

(58) Field of Classification Search
CPC ........ F16J 1/04; F16J 1/08; F16J 1/005; F16J 1/008
See application file for complete search history.

(56) References Cited

U.S. PATENT DOCUMENTS

2004/0045515 A1*  3/2004  Bischofberger .... F02B 23/0603
                                                  123/41.35
2006/0207424 A1    9/2006  Gaiser
(Continued)

FOREIGN PATENT DOCUMENTS

CN    101468426 A    7/2009
DE      3032671 A1   3/1982
(Continued)

OTHER PUBLICATIONS

Zhang, Effects of Temporal Pulse Shaping on Cracking Susceptibility of 6061-T6 Aluminum ND: YAG Laser Welds, Jan. 2008 vol. 87, p. 18-20.*
(Continued)

*Primary Examiner* — Thomas E Lazo
*Assistant Examiner* — Daniel Collins
(74) *Attorney, Agent, or Firm* — Reising Ethington PC (57) ABSTRACT

An exemplary piston may include a piston body having radially inner and outer body mating surfaces. The piston may further include a cooling gallery ring cooperating with the piston body to form a continuous upper combustion bowl surface and a cooling gallery. The cooling gallery ring may have radially inner and outer ring mating surfaces abutted along their corresponding radially inner and outer body mating surfaces, such that the cooling gallery is substantially enclosed. The piston body and cooling gallery ring may be joined together along the radially inner and radially outer interface regions to form a generally one-piece piston assembly. The radially outer interface region may be elongated in a direction parallel to the piston axis, e.g., facilitating a laser welding joining process.

34 Claims, 5 Drawing Sheets

(51) Int. Cl.
*B23P 15/10* (2006.01)
*B23K 26/32* (2014.01)

(52) U.S. Cl.
CPC .... *B23K 2201/003* (2013.01); *B23K 2203/50* (2015.10); *F02F 2003/0061* (2013.01); *Y10T 29/49249* (2015.01)

(56) References Cited

U.S. PATENT DOCUMENTS

| | | |
|---|---|---|
| 2009/0020007 A1 | 1/2009 | Lin et al. |
| 2009/0194059 A1* | 8/2009 | Grahle .................... F02F 3/003 123/193.6 |
| 2011/0197845 A1 | 8/2011 | Flowers et al. |
| 2013/0014724 A1* | 1/2013 | Bischofberger ........... 123/193.6 |

FOREIGN PATENT DOCUMENTS

| | | |
|---|---|---|
| JP | 2-301650 A | 12/1990 |
| JP | 2007270813 A | 10/2007 |
| WO | WO2007/093289 * | 8/2007 |

OTHER PUBLICATIONS

Unitek Miyahi Corporaation, Nd: YAG Laser Welding Guide (2003).*
Kannatey, Principles of Laser Materials Processing (2009).*
Machine Translation of CN101468426.*
Machine Translation of JP2007270812.*
STIC Human Translation of JP2007270813.*
Welding Design, Controlling the Pulse in Laser Welding, Jun. 1, 2004. <http://weldingdesign.com/equipment-amp-automation/controlling-pulse-laser-welding>.*
Human Translation of JP 2007270813.*
International Search Report, PCT/US2012/056550, dated Jan. 4, 2013.
English Abstract for CN101468426.
Office Action for Chinese Application No. 201280046169.X dated Feb. 27, 2015, 12pp.

* cited by examiner

LASER WELDED PISTON ASSEMBLY

CROSS-REFERENCE TO RELATED APPLICATION

This application claims priority to U.S. Provisional Application Ser. No. 61/537,370, filed on Sep. 21, 2012, the contents of which are hereby expressly incorporated by reference in their entirety.

BACKGROUND

Internal combustion engine manufacturers are constantly seeking to increase power output and fuel efficiency of their products. One method of generally increasing efficiency and power is to reduce the oscillating mass of an engine, e.g., of the pistons, connecting rods, and other moving parts of the engine. Efforts to increase engine power and/or efficiency also may also result in an increase in pressure and/or temperature within the combustion chamber during operation.

Engines, and in particular the pistons of the engine, are therefore under increased stress as a result of these reductions in weight and increased pressures and temperatures associated with engine operation. Piston cooling is therefore increasingly important for withstanding the increased stress of such operational conditions over the life of the engine.

To reduce the operating temperatures of piston components, a cooling gallery may be provided about a perimeter of the piston. A coolant such as crankcase oil may be introduced to the cooling gallery, and may be distributed about the cooling gallery by the reciprocating motion of the piston, thereby reducing the operating temperature of the piston.

At the same time, the cooling galleries may increase overall complexity of the piston assembly and manufacturing of the same. For example, cooling galleries may require additional component, such as a cooling gallery cover, in order to encourage proper circulation of a coolant throughout the cooling gallery by temporarily trapping coolant (e.g., oil) that is circulated through the cooling gallery. The additional components such as cover plates also add complexity, however. Additionally, cooling galleries may be expensive and/or difficult to form in smaller piston applications such as in the case of lightweight or light duty pistons. Additionally, known methods of forming enclosed cooling galleries in one-piece pistons, such as friction welding, require extremely high strength piston components to properly form the piston and cooling gallery features without unintended deformation during the friction welding process, thereby increasing size and weight of the resulting pistons. The large magnitude forces placed on the piston components during the friction welding process also limits where the weld joints may be located.

Accordingly, there is a need for a piston that minimizes overall piston weight and manufacturing complexity, while also allowing adequate cooling, such as by providing a cooling gallery.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein of a piston assembly and methods of making the same. An exemplary piston may include a piston body defining a piston axis, the piston body having a skirt and forming a lower surface of a cooling gallery. The body may include radially inner and outer body mating surfaces. The piston may further include a cooling gallery ring cooperating with the piston body to form a continuous upper combustion bowl surface. The cooling gallery ring may include a radially inner ring mating surface abutted along a radially inner interface region in the combustion bowl with the radially inner body mating surface, with the cooling gallery ring including a radially outer ring mating surface abutted along a radially outer interface region with the radially outer body mating surface such that the cooling gallery is substantially enclosed. The piston body and cooling gallery ring may be joined together along the radially inner and radially outer interface regions to form a generally one-piece piston assembly. The radially outer interface region may be elongated in a direction parallel to the piston axis.

In some exemplary illustrations, pistons may be joined in a welding process, e.g., a laser welding process. Exemplary laser welding processes, as will be described further below, may facilitate substantial gains in manufacturing flexibility. In one example, at least one of the radially inner and outer mating surfaces is aligned non-perpendicular to the piston axis. For example, a generally vertical weld joint is possible, i.e., where the corresponding mating surfaces of two piston components being joined are aligned generally parallel to a longitudinal axis of the piston. Moreover, abutting surfaces of a laser welded joint may define virtually any angle so long as the joint is accessible by an impinging laser welding beam. An elongated weld joint may generally result from, in one exemplary illustration, a laser welding process where a laser beam is impinged generally parallel to corresponding mating surfaces of a piston body and a cooling gallery ring.

Figure 1:
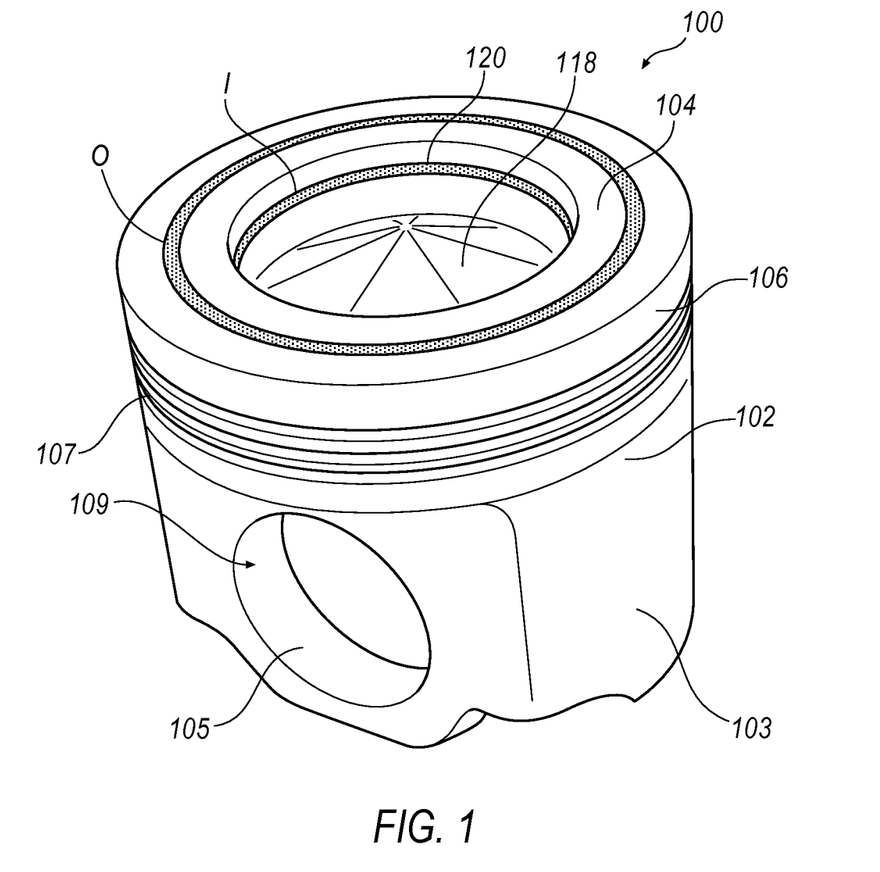
FIG. 1 is a perspective view of an exemplary piston assembly.

Turning now to FIG. 1, an exemplary piston assembly 100 is illustrated. Piston assembly 100 may include a piston body 102 and a cooling gallery ring 104 that is received in the body 102. The piston body 102 and cooling gallery ring 104 may thereby define a combustion bowl 120 having a combustion bowl lower surface 118. The body 102 may include a ring belt portion 106 that is configured to seal against an engine bore (not shown) receiving the piston assembly 100. For example, the ring belt portion 106 may define one or more circumferential grooves 107 that receive piston rings (not shown), which in turn seal against engine bore surfaces during reciprocal motion of the piston assembly 100 within the engine bore. Receipt of the cooling gallery ring 104 within the body 102 may allow flexibility in regard to the size and shape of the cooling gallery ring 104 and/or the piston assembly 100, e.g., allowing a lower overall compression height and/or center of gravity of the piston assembly 100.

The piston body 102 may include a skirt surface 103 that generally supports the piston assembly 100 during engine operation, e.g., by interfacing with surfaces of an engine bore (not shown) to stabilize the piston assembly 100 during reciprocal motion within the bore. For example, the skirt surface 103 may generally define a circular outer shape about at least a portion of a perimeter of the piston assembly 100. The outer shape may correspond to the engine bore surfaces, which may be generally cylindrical.

The body 102 may also define piston pin bosses 105. The piston pin bosses 105 may generally be formed with apertures or pin bores 109 configured to receive a piston pin (not shown). For example, a piston pin may be inserted through the pin bores 109 in the piston pin bosses 105, thereby generally securing the piston 100 to a contacting rod (not shown).

Figure 2A:
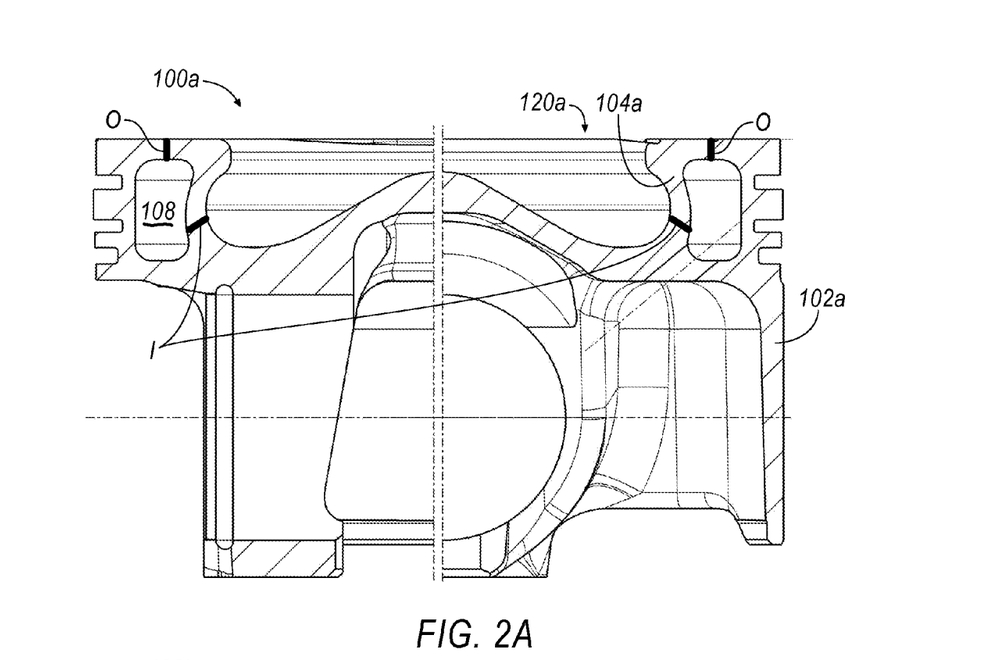
FIG. 2A is a partial section view of an exemplary piston assembly.
Figure 2B:
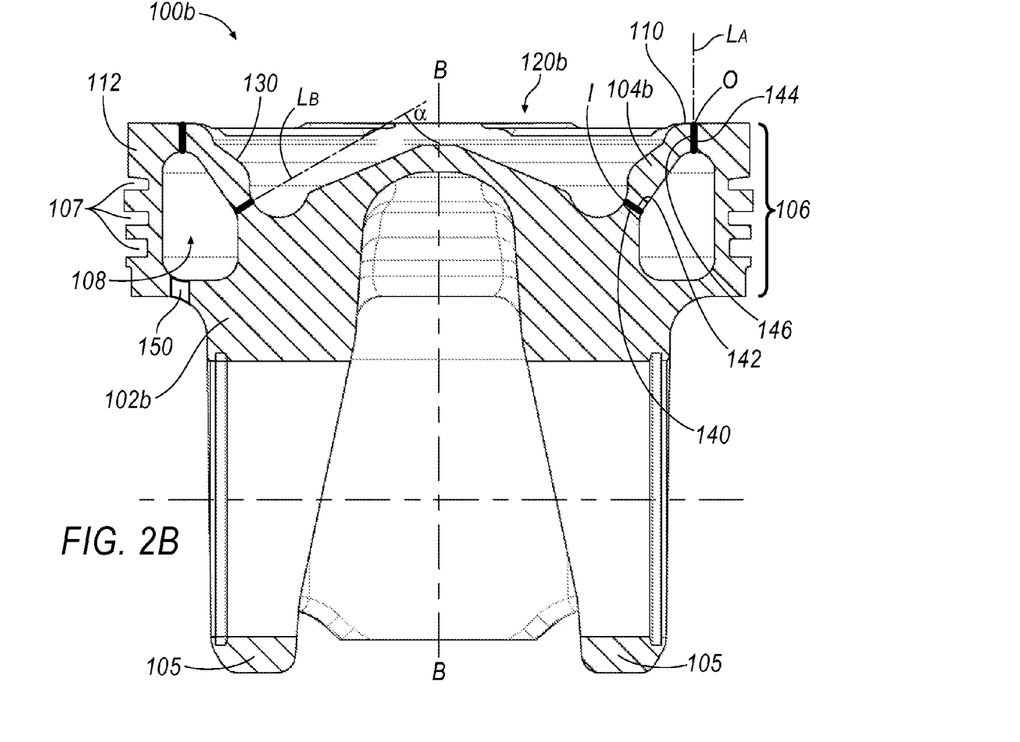
FIG. 2B is a partial section view of another exemplary piston assembly.
Figure 2C:
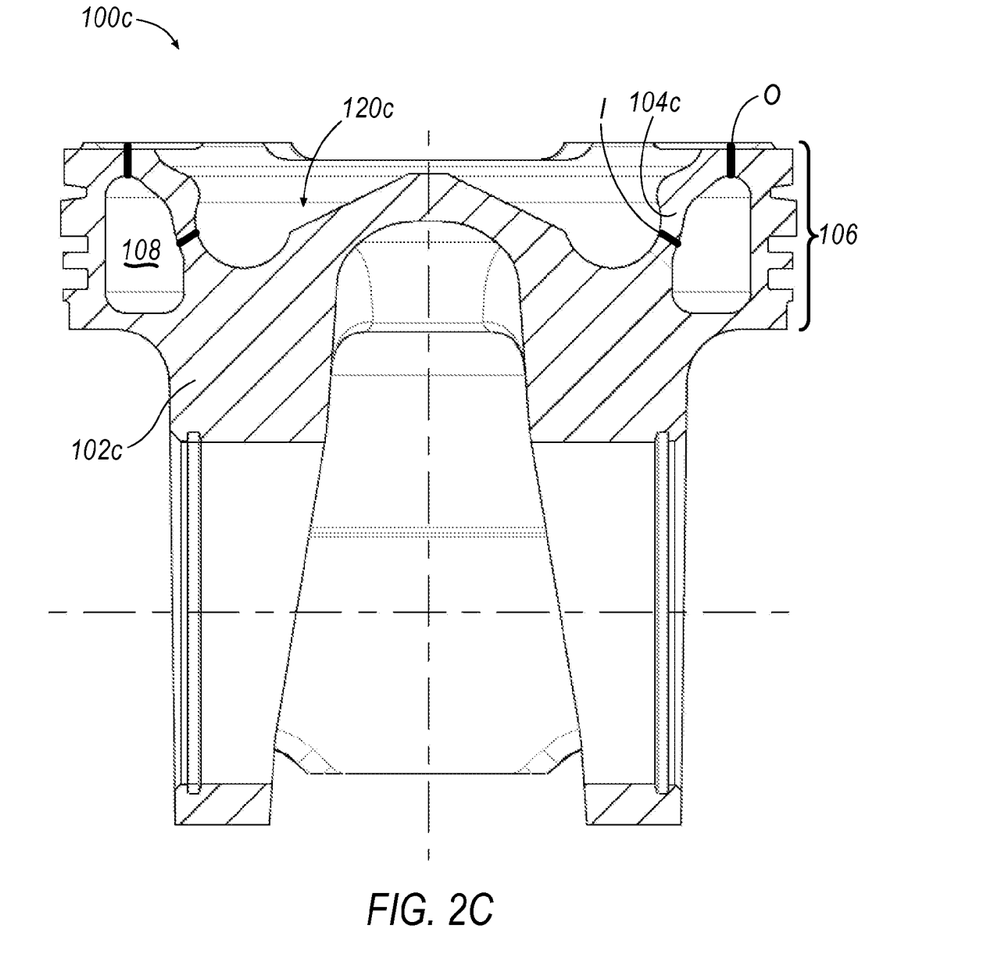
FIG. 2C is a partial section view of another exemplary piston assembly.

Turning now to FIGS. 2A, 2B, and 2C, exemplary pistons 100a, 100b, and 100c (collectively, 100) are illustrated in further detail. Each of the pistons 100 may have a ring belt portion 106 which define, at least in part, a cooling gallery 108. The cooling gallery 108 generally extends about a perimeter of the piston crown, and may circulate a coolant during operation, e.g., engine oil, thereby reducing an operating temperature of the piston. Additionally, the circulation of the coolant may facilitate the maintaining of a more stable or uniform temperature about the piston 100, and especially in the upper portion of the piston assembly 100, e.g., adjacent the combustion bowl 120.

A piston body 102 and ring 104 may be fixedly joined, e.g., in a laser welding process. By fixedly joining the piston body 102 and ring 104, the piston assemblies 100a, 100b, 100c are generally formed as a one-piece assembly.

As will be described further below, in each of the pistons 100a, 100b, and 100c, the body 102 and ring 104 components may be joined along both a radially inner interface region I, and a radially outer interface region O, in a laser welding process. Accordingly, the piston bodies 102a, 102b, 102c (collectively, 102) may be generally unitized with their respective cooling gallery rings 104a, 104b, 104c (collectively, 104), such that each is immovable relative to the other after securement to the crown, although the body 102 and ring 104 are separate components. The cooling gallery rings 104 may be secured to the body 102 such that the body 102 and the ring 104 cooperate to form a continuous upper combustion bowl surface 120 of the piston assembly 100.

Referring now to FIG. 2B, corresponding radially outer mating surfaces 144, 146 of the body 102 and ring 104, respectively, may meet along the upper surface 110 in a radially outer interface region O of a piston 100, e.g., piston 100b. Additionally, corresponding radially inner mating surfaces 140, 142 of the body 102 and ring 104, respectively, may meet within the combustion bowl 120 along the radially inner interface region I such that the cooling gallery ring 104 defines a first radially outer portion 120a of the combustion bowl 120. Further, the skirt body 102 may define a radially inner portion 120b of the combustion bowl surface 120 that is disposed radially inwardly of the radially inner interface region I.

The combustion bowl surface 120 may be substantially smooth across an interface, e.g., radially inner interface region I and/or radially inner interface region O, between the ring 104 and the body 102, thereby minimizing disruptions and/or discontinuities in the surface 120. Minimizing such disruptions or discontinuities may generally reduce cracks or other loosening of an interface between the body 102 and the ring 104 along the interface regions I, O during normal long-term operation. Accordingly, any defects or failure in the combustion bowl surface 120, e.g., due to wear occurring during operation of an engine using piston assembly 100, may be minimized. As will be described further below, welding and/or machining operations used in the formation of piston assembly 100 may reduce surface irregularities in the combustion bowl surface 120.

The piston body 102 and the cooling gallery ring 104 may be secured or fixedly joined to one another in a welding operation such as laser welding. In one exemplary illustration, the piston body 102 and cooling gallery ring 104 are secured to one another along both the radially inner and outer interface regions I, O. A laser weld may allow the weld tool to form a generally smooth combustion bowl surface 120 requiring at most minimal machining operations before and/or after a welding process associated with joining the body 102 and the cooling gallery ring 104. Moreover, in some examples no machining at all may be necessary.

A laser welding operation may generally allow the formation of a solid metallic weld between the body 102 and the ring 104 while also minimizing the size of an associated heat affected zone. More specifically, a weld laser may generally be employed to propagate a heat affected zone in the radially inner interface region I and/or radially outer interface regions O, which may include or be directly adjacent mating surfaces of the body 102 and ring 104, thereby welding together the body 102 and ring 104 along the mating surfaces in the interface regions I, O. For example, a heat affected zone of the radially outer interface region O may include both the radially outer mating surface 144 of the body 102, and the radially outer mating surface of the ring 104.

Where the ring 104 and body 102 are joined using a laser welding process, a weld laser may be used in a generally continuous welding process that extends substantially about the entire circumference of the interface regions I and/or O, such that the weld extends substantially about the entire piston 100. Alternatively, a series of discrete welds may be made along the circumferential extent of the interface region I and/or O.

As noted above, the radially inner interface region I may be positioned along the combustion bowl surface 120. The radially outer interface region O may be positioned along an upper surface 110 of the piston 100b. The positioning of the radially outer interface region O in the upper surface 110 may advantageously allow the body 102, e.g., along the piston ring belt portion 106b, to support the cooling gallery ring 104, especially when the piston 100 is installed within a corresponding bore (not shown). The additional support of the cooling gallery ring 104 in this manner may thereby increase durability of the piston 100 and resistance to high temperature and pressure. In another exemplary illustration, the radially outer interface region O may be positioned along an outer wall 112 of the piston 100, e.g., along the ring belt portion 106b.

A laser welding operation used to join the body 102 and cooling gallery ring 104 may have several advantages compared with other welding methodologies such as friction welding. A laser welding operation typically results in a relatively small heat-affected zone, sometimes as little as a few millimeters. Nevertheless, the heat affected zone may advantageously include a mating surface of the body 102 as well as a corresponding mating surface of the ring 104, as will be described further below. Additionally, a laser weld may be performed in virtually any location on the piston 100 that can be accessed by an impinging laser beam. Accordingly, a laser welding operation may allow substantial flexibility in choosing the location on the piston 100 for an interface region between the body 102 and ring 104, e.g., the radially inner and outer interface regions I, O.

Accordingly, laser welding processes may be advantageous in examples such as those illustrated in FIGS. 2A, 2B, and 2C, where the radially outer interface region O includes generally vertical mating surfaces 144, 146, and where the inner interface region I includes mating surfaces 140, 142 that are angled non-parallel and non-orthogonally with respect to the axis of the piston 100, e.g., axis B-B, as best seen in FIG. 2B.

A laser beam associated with a laser welding operation of the interface regions I, O may be directed generally or substantially parallel to mating surfaces of the body 102 and ring 104 in the interface regions I, O. In one exemplary illustration, a laser beam employed in a laser welding process is angled with respect to the piston axis B-B. For example, as illustrated in FIG. 2B, a laser beam $L_B$ may be directed at an angle α with respect to the piston axis B-B when directed to welding interface region I. Moreover, the laser beam $L_B$ may be directed substantially parallel to mating surfaces 140, 142 along the interface region I.

In another exemplary illustration, a laser beam $L_A$ may be directed substantially parallel to piston axis B-B when directed to welding interface region O, along the upper surface 110 of the piston 100. Moreover, the laser beam $L_A$ may be substantially parallel to mating surfaces 144, 146 between the body 102 and ring 104, respectively, along the interface region O.

Known friction welding methods generally require mating surfaces of the joined components to be normal to the weld and/or piston axis. More specifically, surfaces being friction welded together must generally be aligned normal to a direction associated with the movement of the welded components during the friction welding process, which typically is parallel to the piston axis. Additionally, the extremely large magnitude forces used to drive components being friction welded together requires correspondingly large degrees of support for the welded surfaces in order to prevent damage to the components during welding. Finally, friction welding necessarily requires that components be rotationally symmetrical in order to allow joining the cylindrical parts by rotation at high speeds. By comparison, a laser welding process does not require the piston components, e.g., body 102 and ring 104, to resist the extremely large application forces such as those applied during a friction welding process. Additionally, a laser welding process does not require rotational symmetry since no parts need be moved or rotated during the laser welding process. In fact, asymmetrical or offset interface regions may be employed, e.g., resulting in an asymmetrical combustion bowl (not shown).

Cooling gallery 108 may advantageously define one or more openings 150 that allows for gases to escape during a laser welding process. The provision of at least one opening may be beneficial during the welding process, when any gases or air present inside the cooling gallery 108 will tend to expand rapidly. The openings may thereby prevent damage to the cooling gallery 108 and adjacent surfaces of the piston 100 due to the expansion of gases or air. Moreover, a "keyhole effect" of the expanding gases may damage the weld along the interface regions I, O. More specifically, as the weld seals the cooling gallery 108, expanding gases will tend to damage the weld zone by escaping through the molten material before the material adequately hardens, unless an escape path is provided for the expanding gases, e.g., by the openings. Additionally, openings may be needed to allow coolant, e.g., oil, to be circulated through the cooling gallery during operation. Moreover, any openings may also allow for removal of weld spatter from a laser welding process, as will be described further below. In one exemplary illustration, one or more openings, e.g., opening 150, are provided in the cooling gallery 108 in a lower surface thereof, thereby allowing the openings to be employed as oil/cooling circulation inlets or outlets during operation of the piston 100.

The piston body 102 and cooling gallery ring 104 may be constructed from any materials that are convenient, e.g., which are susceptible to being laser welded. Merely by way of example, any metallic containing compounds that are receptive to being laser welded may be employed. In one exemplary illustration, the body 102 and cooling gallery ring 104 are formed of the same material, e.g., steel. In another example, the body 102 and cooling gallery ring 104 are formed of different materials. Accordingly, a material used for the components may be more closely matched with the general requirements and operating conditions relevant to each. Piston body 102 may, merely as examples, include different mechanical properties, e.g., yield point, tensile strength or notch toughness, than the cooling gallery ring 104. Any material or combination may be employed for the body 102 and cooling gallery ring 104 that is convenient. Merely as examples, the body 102 and/or cooling gallery ring 104 may be formed of a steel material, cast iron, aluminum material, composite, or powdered metal material. The body 102 and/or cooling gallery ring 104 may also be formed in different processes, e.g., the body 102 may be a generally single cast piece, while the cooling gallery ring 104 may be forged. Any material and/or forming combination may be employed that is convenient.

Although steel materials having generally high carbon equivalent values have been traditionally ill-suited for welding in general, in one exemplary illustration a relatively high-carbon equivalent value steel is used for at least one of the body 102 and cooling gallery ring 104. For example, a steel having a carbon content of 0.38%, e.g., 38MnVS6 or a carbon content of 0.42%, e.g., 42 CrMo4, may be employed. Carbon equivalent values may be somewhat higher than actual carbon content on a percentage by weight basis.

The ring 104, due in part to its location at the radially outer region of the combustion bowl 120, may in particular require resistance to high temperatures and pressures, and may have a lower thermal conductivity than the body 102. Accordingly, heat-resistant material, such as Inconel, may be employed. The ring 104 may also require a higher corrosion and/or oxidation resistance than the body 102. In another exemplary illustration, a material employed for the ring 104 has a relatively low sulfur content. A low sulfur content may result in a more consistent and higher-quality weld along both the inner and outer interface regions I, O.

In another exemplary illustration, a higher nickel content in at least one of the body 102 and ring 104 may improve weld quality. Moreover, in some examples a nickel-based material may be added, e.g., a nickel-iron as a filler material, during the welding process to promote a higher quality weld.

Prior to securing the body 102 and ring 104 together, e.g., via laser welding, the body 102 and ring 104 may be pre-assembled in a secure and yet non-permanent manner. For example, a shrink fit or interference fit between the two components may be employed. In one example, the body 102 is placed at an elevated temperature, initiating a thermal expansion sufficient to allow insertion of the ring 104 into the body 102. Upon cooling of the body 102 to a lower temperature, the thermal expansion of the body 102 is reversed, thereby constraining the ring 104 in place. In another exemplary illustration, the body 102 and ring 104 are formed of materials having different coefficients of thermal expansion, such that application of heat to both components results in a greater degree of thermal expansion of the body 102, allowing insertion of the ring 104.

A small weld tack may, alternatively or in addition to the shrink fit or interference fit described above, be employed to further secure the body 102 and ring 104 together prior to permanently joining the body 102 and ring 104, e.g., in a laser welding process.

A laser welding process may advantageously allow for smaller heat-affected zones in the components being welded together, e.g., of only a few millimeters, as noted above. However, the relatively small heat-affected zone may also result in an extreme temperature gradient within the material adjacent the heat affected zone or weld. Accordingly, cracks may propagate in the welded material due to the large temperature change in the material over a very small distance. It may therefore be desirable to reduce this gradient by pre-heating the welded components, e.g., in a furnace or by induction. In one exemplary illustration, both the body 102 and ring 104 are heated to between approximately 200 and 600 degrees Celsius.

Any variety of laser welding systems may be employed as part of an exemplary laser welding process. For example, a solid state, disk, carbon-dioxide, or fiber laser may be employed. Carbon-dioxide laser systems are well known and may therefore be more familiar in mass manufacturing settings than, for example, more recently developed fiber laser systems. However, a carbon-dioxide laser process also typically requires a large machine that cannot be easily moved, e.g., around a manufacturing facility, whereas a solid state laser may be employed anywhere a fiber or light-transmitting medium can be extended.

Typically, a thicker weld joint may require a greater power laser to properly melt the materials being joined. In one exemplary illustration, a 6 millimeter (mm) thickness of the materials being joined is adequately welded with a 6 kilowatt (kW) laser at a feed rate of 2.0 meters per minute, using a beam width or thickness of 300-400 micrometers (μm).

A laser welding process may inherently cause at least some degree of weld spatter beyond the interface regions I, O, and in particular within the cooling gallery 108. Accordingly, it may be desirable to reduce spatter in one of several ways. In one example, adding nickel to the materials being welded together may reduce an amount of weld spatter. In another exemplary illustration, the circulation of an inert gas such as Helium or Argon within the cooling gallery 108 and/or about the weld sites may also reduce spatter. Moreover, a mechanical element may be positioned within the cooling gallery 108 to catch any spatter, and subsequently removed. For example, a temperature-resistant fibrous material may be packed into the cooling gallery and removed after the welding process is complete. In another example, a carbon coating is applied to the inner surfaces of the cooling gallery 108. Carbon coating the inner surfaces may generally inhibit or prevent weld spatter from adhering to the surfaces, facilitating removal afterwards, e.g., by a washing or high-pressure flushing operation.

As noted above, the laser welding process may be particularly advantageous because of a relatively small heat-affected zone, in some cases only a few millimeters beyond the weld joint, but may also suffer from an extreme temperature gradient in the material(s) adjacent the weld over a correspondingly short distance. To prevent cracks or low-quality welds that might otherwise occur due in part to this temperature gradient, the laser process may itself be controlled to reduce spatter that may result within the cooling gallery 108. In one example, laser power may be ramped down gradually, allowing a controlled decrease in temperature in the material from a maximum temperature associated with the melting of the material that occurs during the welding process. In one exemplary illustration, a gradual ramp-down in laser power is employed that may more gradually decrease weld material temperature, instead of immediately ceasing the welding activity and initiating a more severe cooling temperature gradient in the material.

In one exemplary illustration of a laser welding cool down, a weld laser continues to move along a weld path, e.g., along the interface regions I and/or O moving around a perimeter of the piston 100, as power to the laser is gradually reduced until the laser is turned off entirely. In another exemplary illustration, the laser travels between approximately five (5) and forty (40) degrees angularly with respect to the piston 100 from a time at which laser power begins to be reduced, and a time at which the laser power is cut off entirely. In yet another example, the laser power may decrease linearly during the ramp-down with respect to time and/or angular position of the piston 100. Additionally, it may be desirable to initiate the ramp-down of the laser power in a lower stress area of the piston 100, e.g., a position along the interface regions I and/or O where internal stresses are less than in other areas along interface regions I and/or O. A controlled reduction in material temperature may be further enhanced by a pre-heating of the body 102 and/or cooling gallery ring 104, as the pre-heating may decrease an overall difference in temperature across the piston 100 during the welding process.

After welding the body 102 and ring 104 together, any weld spatter may be removed from the cooling gallery 108. In one exemplary illustration, a high pressure flushing operation may be employed, where a fluid is circulated through the cooling gallery 108 at high pressure. Removal of weld spatter may be facilitated, as noted above, with a coating on the inner surfaces of the cooling gallery 108, e.g., a carbon coating.

Laser welding may also advantageously reduce post-processing steps required to complete formation of the piston 100 and relevant features. More specifically, the relatively small heat-affected zone typical of the exemplary laser welding processes may result in small deviations in shape in the areas adjacent the weld. Accordingly, the piston 100 may be formed in a near-net shape upon conclusion of the laser welding process, resulting in little if any need for machining of any of the areas of the piston 100 adjacent the interface regions I, O. In one exemplary illustration, generally circular machining or grinding tools are employed to finish machining of the interface regions I, O. Accordingly, an apex 130 relative to the combustion bowl 120 may be formed in the cooling gallery ring 104 as a result of the machining away of material adjacent the radially inner interface region I.

Additionally, in contrast to a friction welding process where material flash is inherently created, a laser welding process results in little, if any, material flash or exposure of underlying areas of the weld joint. The lack of material flash or weld curl enhances the smooth surface about the interface regions, reducing stress risers that otherwise may tend to propagate stresses or cracks in the weld joint. In turn, the reduction in flashing reduces material waste. The reduction in flashing also has the further advantage of lowering piston weight in those situations where the flash is created in a closed cavity that cannot be readily removed during subsequent machining operations required when friction welding.

Various examples of exemplary laser weld joints between a ring 104 and body 102 are illustrated in FIGS. 3A, 3B, 3C, and 3D. As shown, the weld joints have a substantially smooth weld contour encompassing the mating surfaces of the body 102 and ring 104 in the relevant interface region. Additionally, external surface contours remain substantially smooth and/or have a minimum of surface discontinuities, reducing or even eliminating any need for additional machining or finishing steps. For example, the welds $W_1$ and $W_2$ do not create excess material flashing, e.g., as may result from a friction welding process, within the combustion bowl 120 and/or along the upper surface 110.

Figure 3A:
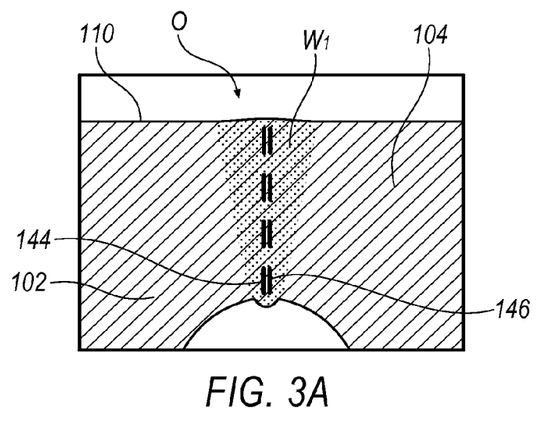
FIG. 3A illustrates a section view of an exemplary laser weld of a radially outer interface region between a piston body and a cooling gallery ring.

As shown in FIG. 3A the body 102 and ring 104 are joined together in the radially outer interface region O. A weld $W_1$ between the body 102 and ring 104 encompasses the mating surfaces 144, 146 (shown in phantom) of the body 102 and ring 104, respectively, such that the mating surfaces 144, 146 are generally secured together. The weld $W_1$ is generally elongated in a direction parallel to the mating surfaces 144, 146 and/or the piston axis (not shown in FIG. 3A), reflecting the generally narrow heat-affected zone initiated by an impinging laser beam (e.g., laser beam $L_B$, see FIG. 2B) used to weld the body 102 and ring 104.

Figure 3B:
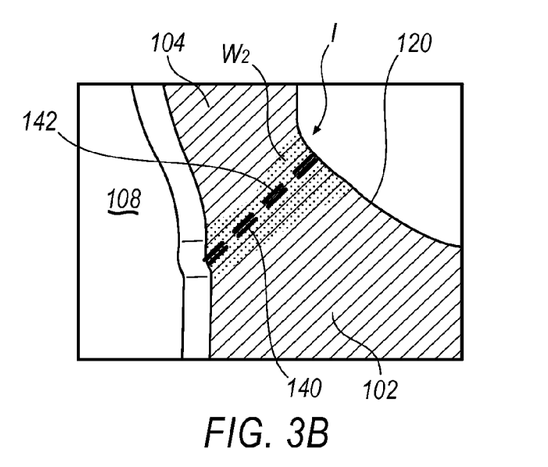
FIG. 3B illustrates a section view of an exemplary laser weld of a radially inner interface region between a piston body and a cooling gallery ring.
Figure 3C:
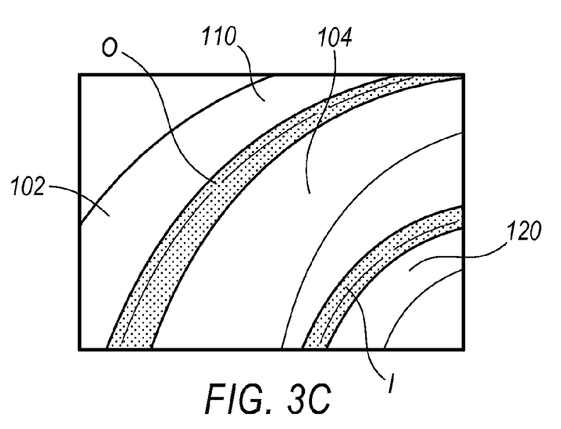
FIG. 3C illustrates a perspective view of exemplary laser welds of a radially inner interface region and a radially outer interface region between a piston body and a cooling gallery ring.

As shown in FIG. 3B, the body 102 and ring 104 are joined together in the radially inner interface region I. A weld $W_2$ between the body 102 and ring 104 encompasses the mating surfaces 140, 142 (shown in phantom) of the body 102 and ring 104, respectively, such that the mating surfaces 140, 142 are generally secured together. The weld $W_2$ is also generally elongated, however in a direction parallel to the mating surfaces 140, 142. Moreover, the weld $W_2$ may also thereby be elongated in a direction defining a non-parallel and non-orthogonal angle to the piston axis (not shown in FIG. 3A), reflecting the generally narrow heat-affected zone initiated by an impinging laser beam (e.g., laser beam LA, see FIG. $2_B$) used to weld the body 102 and ring 104.

The exemplary pistons 100 disclosed herein may be employed in small and large bore diameter applications, generally without limitation. The reduced material flash and weld joint size may advantageously allow for smaller overall geometry of the piston 100. Compression height, i.e., ratio of piston diameter to a distance between the upper surface 110 and a center of the bore defined by the pin bosses 105 may be reduced. In one exemplary illustration, a piston 100 may have a compression height of approximately twenty-five (25) to fifty-five (55) percent (compared with known compression heights of approximately fifty-five (55) to seventy (70) percent for a comparable friction welded design). The minimal or nonexistent weld flash may also facilitate a shallow bowl geometry. Finally, a smaller compression height reduces size and weight of the piston 100, allowing smaller engine blocks and smaller components overall, allowing greater freedom in vehicle packaging around the engine block. A longer connecting rod may also be employed where compression height is minimized, reducing lateral forces during engine operation against the engine bore. This may in turn reduce friction between the piston 100 and the bore, improving engine efficiency.

Additionally, the piston assembly 100 may also tolerate increased peak combustion pressures as a result of the rigidity of the piston assembly 100 and the additional flexibility in material selection. Manufacturing costs may also be reduced due to the simplified forging and welding processes that may be used in some exemplary illustrations.

Figure 4:
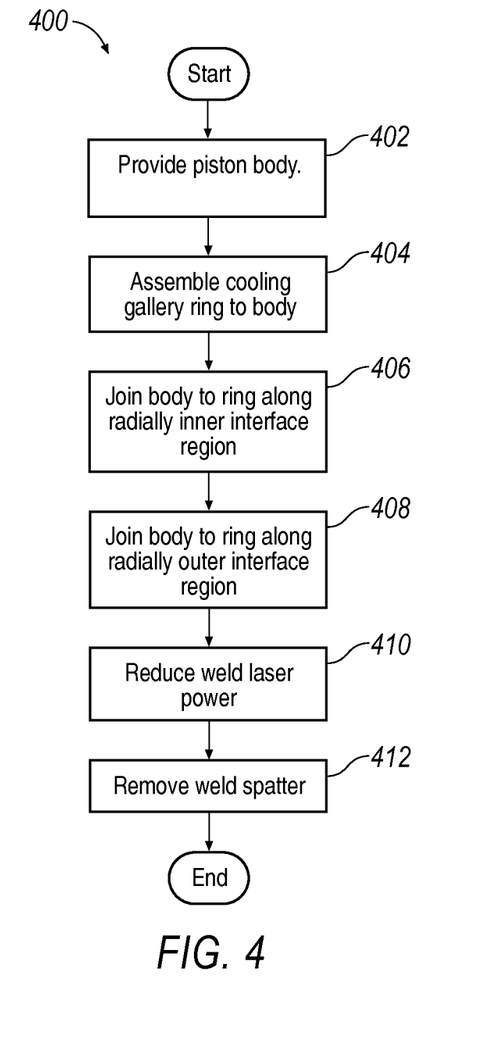
FIG. 4 illustrates a process flow diagram for an exemplary method of making a piston.

Proceeding to FIG. 4, an exemplary process 400 for assembling a piston, e.g., piston 100, is illustrated. Process 400 may being at block 402, where a piston body is provided. For example, as described above a piston body 102 may be formed, e.g., in a casting or forging process. Moreover the piston body 102 may include radially inner and outer mating surfaces 140, 144.

Proceeding to block 404, a cooling gallery ring may be assembled to the body. For example, as described above a cooling gallery ring 104 may be formed, e.g., in a casting or forging process, and may include radially inner and outer mating surfaces 142, 146 that correspond to those of the piston body 102. The ring 104 may be assembled to the body 102 in a manner to facilitate secure positioning of the ring 104 relative to the body 102, without permanently securing the two components together. For example, a shrink fit may be used, e.g., by bringing the temperature of the body 102 to a sufficiently elevated temperature such that the ring 104 fits into the body 102. Moreover, a relatively small mechanical fastening between the body 102 and ring 104 may be employed, e.g., a weld tack. Additionally, as noted above the ring 104 may be formed of a same material or a different material as the body 102. Process 400 may then proceed to block 406.

At block 406, the body 102 may be joined to ring 104 along a radially inner interface region. For example, as noted above in some exemplary approaches a laser weld may be employed to join corresponding mating surfaces of the ring 104 and body 102, e.g., mating surfaces 142, 140 respectively. Moreover, the mating surfaces may be elongated in a direction generally parallel to the impingement of a laser. The laser itself may result in a relatively narrow weld and/or heat affected zone. For example, a weld $W_2$ may be elongated such that it has a width in a direction generally perpendicular to the mating surfaces 140, 142 that is smaller than a height, i.e., a length of the mating surfaces 140, 142 in a direction parallel to the impingement of the laser beam. At least one of the cooling gallery ring 104 and the body 102 may be pre-heated, e.g., to facilitate pre-assembly of the ring 104 and body 102, as well as reduce temperature gradients within the ring 104 and/or body 102 as a result of a laser welding process.

Proceeding to block 408, the body may be joined to the ring along a radially outer interface region. As with the radially inner interface region, mating surfaces of the ring 104 and body 102 may be aligned generally parallel to an impinging laser beam. Moreover, as described above mating surfaces 144, 146 of the body 102 and ring 104, respectively, may be oriented generally vertically, i.e., in a direction generally parallel to a piston axis B-B. Process 400 may then proceed to block 410.

At block 410, a laser power may be reduced during a laser welding process. For example, as noted above a reduction in laser power during the laser welding of the ring 104 to the body 102 may minimize temperature gradients within the two components and control an initial reduction in temperature in the heat affected zone(s) of the ring 104 and body 102. In one example, laser power is reduced as the laser is directed along one of the radially outer and inner interface regions O, I. In another exemplary illustration, the laser is reduced in power as the laser is directed along a predetermined angular extent of a perimeter of the piston 100. For example a laser cool down may be initiated over an angular extent of the piston between approximately 5 and 40 degrees. Moreover, at least a portion of the cool down in laser power may be linear, such that laser power decreases at a constant rate. Additionally, a laser cool down may be initiated during any subprocess of a laser welding step as a finishing portion of the subprocess. For example, a laser may be depowered during application to the radially outer interface region O, and may again be depowered during application to the radially inner interface region I.

Proceeding to block 412, weld spatter may be removed from the piston, and in particular from the cooling gallery 108. For example, a temperature-resistant material or flame-resistant material may be placed within the cooling gallery 108 prior to laser welding, such that the material may "catch" any spatter and prevent the same from adhering to an interior surface of the cooling gallery 108. In another example a high-pressure flushing operation is used to dislodge and remove any weld spatter that adheres to the interior surfaces of the cooling gallery 108.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    providing a steel piston body defining a piston axis, the piston body forming a lower surface of a cooling gallery, the body including radially inner and outer body mating surfaces;
    assembling a steel cooling gallery ring with the piston body such that the piston body and cooling gallery ring cooperate to form a continuous upper combustion bowl surface having a radially inner portion defined by the piston body and a radially outer portion defined by the cooling gallery ring, the cooling gallery ring including a radially inner ring mating surface and a radially outer ring mating surface, wherein all mating surfaces between the piston body and the cooling gallery ring are aligned non-perpendicular to the piston axis;
    joining the body to the cooling gallery ring along a radially inner interface region, the radially inner interface region including the corresponding radially inner mating surfaces of the body and the cooling gallery ring;
    joining the body to the cooling gallery ring along a radially outer interface region, the radially outer interface region including the radially outer mating surfaces of the body and cooling gallery ring, wherein the radially outer interface region is elongated in a direction parallel to the piston axis; and
    establishing at least one of joining the body to the cooling gallery ring along a radially inner interface region and joining the body to the cooling gallery ring along the radially outer interface region as including laser welding, wherein the laser welding includes directing a laser along a path, the path extending along one of the body mating surfaces and one of the ring mating surfaces, the path oriented in a direction extending through an interior of the cooling gallery,
    wherein the laser welding includes:
        running the laser at a first laser power, and then
        running the laser at a second laser power less than the first power; wherein the ring is interference fit to the body along the radially outer interface region including the radially outer mating surfaces of the body and cooling gallery ring.

2. The method of claim 1, wherein the laser welding includes directing a weld laser substantially parallel to the piston axis toward the radially outer mating surfaces of the body and cooling gallery ring.

3. The method of claim 1, wherein the laser welding includes directing a weld laser in a direction toward the radially inner mating surfaces of the body and cooling gallery ring, the direction defining a non-parallel angle with respect to the piston axis.

4. The method of claim 1, wherein the piston body includes a skirt configured to interface with an engine bore surface.

5. The method of claim 1, wherein the running the laser at the second laser power includes directing the laser along a predetermined angular extent of a perimeter of the piston body.

6. The method of claim 5, wherein the predetermined angular extent of the perimeter of the piston body is between approximately five (5) and forty (40) degrees.

7. The method of claim 5, wherein the running the laser at the second laser power includes a linear reduction in power from the first laser power such that laser power decreases at a constant rate over the predetermined angular extent.

8. The method of claim 1, further comprising heating at least one of the body or the cooling gallery ring prior to the laser welding.

9. The method of claim 8, wherein heating the at least one of the body or the cooling gallery ring includes heating the at least one of the body or the cooling gallery ring to at least 200 degrees Centigrade (C).

10. A method comprising:
providing a piston body defining a piston axis, the piston body forming a lower surface of a cooling gallery, the body including radially inner and outer body mating surface;
assembling a cooling gallery ring with the piston body such that the piston body and cooling gallery ring cooperate to form a continuous upper combustion bowl surface having a radially inner portion defined by the piston body and a radially outer portion defined by the cooling gallery ring, the cooling gallery ring including a radially inner ring mating surface and a radially outer ring mating surface, wherein all of the mating surfaces are aligned non-perpendicular to the piston axis;
joining the body to the cooling gallery ring along a radially inner interface region, the radially inner interface region including the corresponding radially inner mating surface of the body and the cooling gallery ring;
joining the body to the gallery ring along a radially outer interface region, the radially outer interface region including the radially outer mating surfaces of the body and cooling gallery ring, wherein the radially outer interface region is elongated in a direction parallel to the piston axis;
establishing at least one of joining the body to the cooling gallery ring along a radially inner interface region and joining the body to the cooling gallery ring along the radially outer interface region as including laser welding, wherein the laser welding includes directing a laser along a path, the path extending along one of the body mating surfaces and one of the ring mating surfaces, the path oriented in a direction extending through an interior of the cooling gallery; and
removing a weld spatter from the cooling gallery after the laser welding.

11. The method of claim 1, wherein the running the laser at the second laser power includes a linear reduction in power from the first laser power such that laser power decreases at a constant rate over a predetermined angular extent of a perimeter of the piston body.

12. The method of claim 1, further comprising heating at least one of the body or the cooling gallery ring prior to the laser welding.

13. A piston assembly, comprising:
a piston body defining a piston axis, the piston body having a skirt and forming a lower surface of a cooling gallery, the body including radially inner and outer body mating surfaces; and
a cooling gallery ring cooperating with the piston body to form a continuous upper combustion bowl surface wherein the cooling gallery ring defines a radially outer portion of the combustion bowl surface and the piston body defines a radially inner portion of the combustion bowl surface, the cooling gallery ring including a radially inner ring mating surface abutted along a radially inner interface region in the combustion bowl with the radially inner body mating surface, the cooling gallery ring including a radially outer ring mating surface abutted along a radially outer interface region with the radially outer body mating surface such that the cooling gallery is substantially enclosed, wherein all of the mating surfaces are aligned non-perpendicular to the piston axis;
wherein the piston body and cooling gallery ring are welded together along the radially inner and radially outer interface regions, and at least one of the radially inner and outer mating surfaces is aligned parallel to the piston axis, thereby defining a weld that is elongated in a direction parallel to the piston axis; and
wherein the at least one of the radially inner and outer mating surfaces are oriented along a path, the path oriented in a direction extending through an interior of the cooling gallery,
wherein the ring and the body are composed of steel and consist of two parts, with the body including a skirt surface and an entire ring belt portion of the piston;
wherein the ring is interference fit to the body along the radially outer interface region including the radially outer mating surfaces of the body and cooling gallery ring.

14. The piston assembly of claim 13, wherein the body defines a radially inner portion of the combustion bowl surface and the ring defines a radially outer portion of the combustion bowl surface.

15. The piston assembly of claim 13, wherein the radially outer mating surfaces of the piston body and the cooling gallery ring are aligned generally parallel to the piston axis.

16. The piston assembly of claim 15, wherein the radially inner mating surfaces of the piston body and the cooling gallery ring are aligned in a direction non-parallel to the piston axis.

17. The method of claim 1, wherein the one of the body mating surfaces and the one of the ring mating surfaces each extend along the laser path and straight to an interior surface of the cooling gallery.

18. The method of claim 1, wherein the laser welding includes decreasing a laser power when the laser is positioned along a lower stress region of one of the interface regions, wherein the lower stress region has a lower internal stress than another region of the one of the interface regions.

19. A method, comprising:
providing a piston body defining a piston axis, the piston body forming a lower surface of a cooling gallery, the body including radially inner and outer body mating surface;
assembling a cooling gallery ring with the piston body such that the piston body and cooling gallery ring cooperate to form a continuous upper combustion bowl surface having a radially inner portion defined by the piston body and a radially outer portion defined by the cooling gallery ring, the cooling gallery ring including a radially inner ring mating surface and a radially outer ring mating surface, wherein all mating surfaces are aligned non-perpendicular to the piston axis;

joining the body to the cooling gallery ring along a radially inner interface region, the radially inner interface region including the corresponding radially inner mating surface of the body and the cooling gallery ring, joining the body to the cooling gallery ring along a radially outer interface region, the radially outer interface region including the radially outer mating surfaces of the body and cooling gallery ring, wherein the radially outer interface region is elongated in a direction parallel to the piston axis; and establishing at least one of joining the body to the cooling gallery ring along a radially inner interface region and joining the body to the cooling gallery ring along the radially outer interface region as including laser welding, wherein the laser welding includes directing a laser along a path, the path extending along one of the body mating surfaces and one of the ring mating surfaces, the path oriented in a direction extending through an interior of the cooling gallery, wherein the ring is shrink fit to the body.

20. The method of claim 19, wherein a temperature of the body is raised relative to the ring to allow insertion of the ring into the body.

21. The method of claim 20, wherein both the body and the ring are pre-heated.

22. The method of claim 21, wherein the body and the ring are composed of materials having different coefficients of thermal expansion.

23. The method of claim 1, wherein the weld paths intersect at a location within the interior of the cooling gallery.

24. The method of claim 1, wherein the laser welding includes decreasing laser power while maintaining a constant laser feed rate.

25. The piston assembly of claim 13, wherein the ring and the body are composed of a high carbon equivalent value steel.

26. The piston assembly of claim 13, wherein the steel includes at least one of 0.38% carbon content steel or a 0.42% carbon content steel.

27. The piston assembly of claim 26, wherein the steel includes at least one of 38MnVS6 steel or 42CrMo4 steel.

28. The piston assembly of claim 13, wherein a ratio of compression height of the piston assembly to a diameter of the piston is less than 55%.

29. The piston assembly of claim 13, wherein a fit between the cooling gallery ring and the piston body is a shrink-fit.

30. The piston assembly of claim 13, wherein the piston body is composed of a cast material and the cooling gallery ring is composed of a forged material.

31. A method comprising: providing a steel piston body defining a piston axis, the piston body forming a lower surface of a cooling gallery, the body including radially inner and outer body mating surfaces; assembling a steel cooling gallery ring with the piston body such that the piston body and cooling gallery ring cooperate to form a continuous upper combustion bowl surface having a radially inner portion defined by the piston body and a radially outer portion defined by the cooling gallery ring, the cooling gallery ring including a radially inner ring mating surface and a radially outer ring mating surface, wherein all mating surfaces between the piston body and the cooling gallery ring are aligned non-perpendicular to the piston axis; joining the body to the cooling gallery ring along a radially inner interface region, the radially inner interface region including the corresponding radially inner mating surfaces of the body and the cooling gallery ring; joining the body to the cooling gallery ring along a radially outer interface region, the radially outer interface region including the radially outer mating surfaces of the body and cooling gallery ring, wherein the radially outer interface region is elongated in a direction parallel to the piston axis; and establishing at least one of joining the body to the cooling gallery ring along a radially inner interface region and joining the body to the cooling gallery ring along the radially outer interface region as including laser welding, wherein the laser welding includes directing a laser along a path, the path extending along one of the body mating surfaces and one of the ring mating surfaces, the path oriented in a direction extending through an interior of the cooling gallery, wherein the laser welding includes: running the laser at a first laser power, and then running the laser at a second laser power less than the first laser power wherein a nickel-based material is added as a filler material during the welding process to promote a higher quality weld.

32. A method comprising: providing a steel piston body defining a piston axis, the piston body forming a lower surface of a cooling gallery, the body including radially inner and outer body mating surfaces; assembling a steel cooling gallery ring with the piston body such that the piston body and cooling gallery ring cooperate to form a continuous upper combustion bowl surface having a radially inner portion defined by the piston body and a radially outer portion defined by the cooling gallery ring, the cooling gallery ring including a radially inner ring mating surface and a radially outer ring mating surface, wherein all mating surfaces between the piston body and the cooling gallery ring are aligned non-perpendicular to the piston axis; joining the body to the cooling gallery ring along a radially inner interface region, the radially inner interface region including the corresponding radially inner mating surfaces of the body and the cooling gallery ring; joining the body to the cooling gallery ring along a radially outer interface region, the radially outer interface region including the radially outer mating surfaces of the body and cooling gallery ring, wherein the radially outer interface region is elongated in a direction parallel to the piston axis; and establishing at least one of joining the body to the cooling gallery ring along a radially inner interface region and joining the body to the cooling gallery ring along the radially outer interface region as including laser welding, wherein the laser welding includes directing a laser along a path, the path extending along one of the body mating surfaces and one of the ring mating surfaces, the path oriented in a direction extending through an interior of the cooling gallery, wherein the laser welding includes: running the laser at a first laser power, and then running the laser at a second laser power less than the first laser power wherein an inert gas is circulated within the cooling gallery to reduce weld spatter.

33. A piston assembly produced by the method of claim 1.

34. A piston assembly produced by a method of claim 19.

* * * * *